No. 837,616. PATENTED DEC. 4, 1906.
H. H. C. DUNWOODY.
WIRELESS TELEGRAPH SYSTEM.
APPLICATION FILED MAR. 23, 1906.

Witnesses
J. G. Hinkel
R. J. McCarty

Inventor
Henry H. C. Dunwoody
by
Attorneys

UNITED STATES PATENT OFFICE.

HENRY H. C. DUNWOODY, OF WASHINGTON, DISTRICT OF COLUMBIA.

WIRELESS-TELEGRAPH SYSTEM.

No. 837,616.        Specification of Letters Patent.        Patented Dec. 4, 1906.

Application filed March 23, 1906. Serial No. 307,679.

*To all whom it may concern:*

Be it known that I, HENRY H. C. DUNWOODY, a citizen of the United States, residing at Washington, in the District of Columbia, have invented certain new and useful Improvements in Wireless-Telegraph Systems, of which the following is a specification.

My invention relates to wireless telegraph or signaling systems, and has for its object more particularly to provide an improved wave responsive or detecting device, as well as an improved arrangement of such device in connection with the ordinary apparatus of the receiving-station; and to these ends my invention consists in a wave responsive or detecting device, of the character substantially specified, arranged and operating substantially in the manner hereinafter pointed out.

Figure 1:
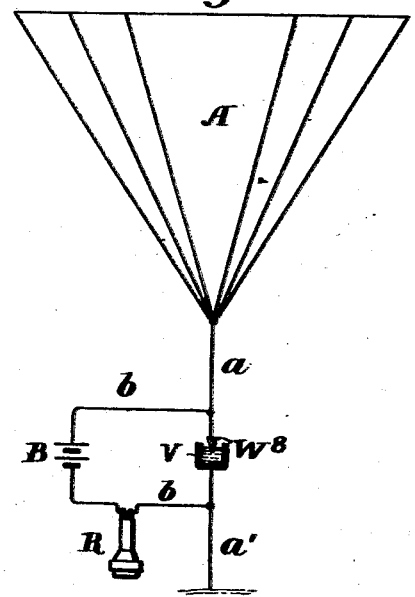
Figure 2:
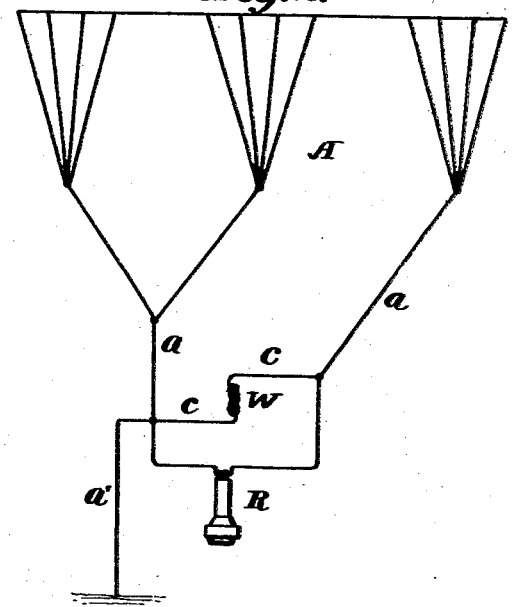

In the accompanying drawings, wherein I have indicated some of the ways in which I have utilized my invention, Figure 1 is a diagram of a wave receiving and signaling apparatus of a simple form. Fig. 2 is another diagram; and Figs. 3 to 14 are detailed views showing some specific embodiments and arrangements of the wave-responsive device, which will be more particularly described hereinafter.

My improved wave responsive or detecting device, broadly stated, comprises a mass or body of non-metallic crystalline material, and in practice I have generally used such a mass or body comprising crystalline silicid of carbon or carborundum. This material may be in any desired shape or size, and is generally in the form of a concrete mass or body of crystals which may vary in size and character, and which are composed of carbon and silicon in a chemical combination forming what is chemically known as a "carbid" of silicon, or silicid or carborundum, and is a highly-refractory material, extremely hard and a relatively poor conductor of electricity. This wave-responsive material may be utilized in many and various forms and connected in the circuit of the signal-receiving apparatus in many and various ways, some of which are indicated in the annexed drawings, and I do not, therefore, limit myself to any particular manner of using the material.

In the drawings, A represents an aerial receiving conductor or wave collector or antennæ which may be of any well-known or desirable form, being shown, for convenience, as embodying what is generally known as the "fan" type of aerial receiver. This receiver or collector is connected to a conductor $a$, having a ground terminal $a'$, and interposed in this conductor is the wave-responsive device W'.

In Fig. 1 there is a branch circuit including a battery B and conductors $b\ b'$, which are connected to the conductors $a\ a'$ at opposite sides of the wave-responsive device W'. This circuit includes a signal-receiving device, shown in the present case as in the form of an ordinary magnetotelephone receiver R, in practice this being usually embodied in the ordinary head-telephone form for convenience.

Figure 3:

The wave-responsive device W', indicated in Fig. 1, may be of many and various forms and in Fig. 3 I have indicated it in the form of a mass or body of crystalline material as carborundum, to which the ends of the wires or conductors $a\ a'$ are secured in any suitable way as by being twisted or bound tightly around the ends of the body.

Figure 4:
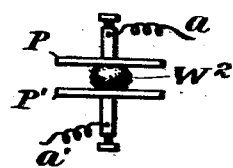

In Fig. 4 the wave-responsive device is shown in the form of a regular mass $W^2$, of the crystalline material supported between two plates or bodies P P' of conducting material, to which the conductors $a\ a'$ are connected.

Figure 5:

In Fig. 5 the wave-responsive device $W^3$ comprises two pieces or bodies of the crystalline material or carborundum having at least one relatively sharp edge, and the edges of the two pieces are placed in contact and may be supported in this relation in any suitable way, and are included in the circuit as before.

Figure 6:
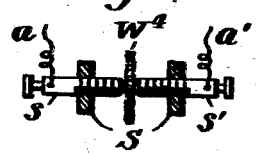

In Fig. 6 the wave-responsive device $W^4$ is shown in the form of a relatively thin plate or mass of carborundum supported between adjusting-screws $s\ s'$, mounted in a suitable frame or support S and connected in the electric circuit.

Figure 7:
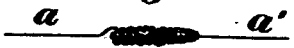

In Fig. 7 I have indicated a concrete mass $W^5$ of the material, to one end of which the conductor $a$ is connected in any suitable way, as by being turned or twisted around the body, while the other terminal or conductor $a'$ simply rests in contact with the mass.

Figure 8:
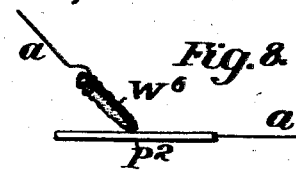

In Fig. 8 the material $W^6$ is connected to one of the conductors or wires $a$ and rests by gravity upon a plate P² connected to the other conductor or wire a'.

Figure 9:
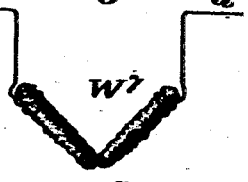

In Fig. 9 the wave-responsive device W⁷ comprises two bodies of the crystalline material connected to the conductors as before, but having portions of their bodies in relatively loose contact.

Figure 10:
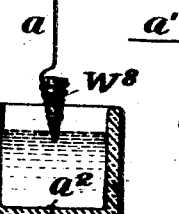

In Fig. 10, I have shown a vessel V containing some electrolyte, as mercury, or an acid, or an alkali fluid, and the wave-responsive device W⁸ is preferably in the form of a pointed mass, and at one end is connected to the conductor a the smaller or pointed mass being immersed to a greater or less extent in the electrolyte, and the other conductor a' is either connected to the vessel V, if it is of conducting material, or to a separate electrode or terminal a² immersed in the electrolytic fluid.

Figure 11:
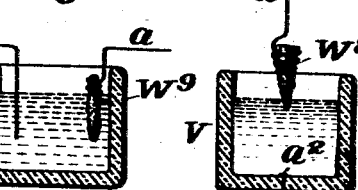

In Fig. 11 the wave-responsive device comprises the mass W⁹ of the crystalline material connected to one conductor a immersed in an electrolyte, while the other conductor a' extends into the electrolyte at a distance away from the mass.

Figure 12:
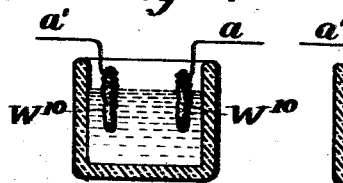

In Fig. 12 is shown a substantially similar arrangement, except that there are two bodies or masses of crystalline wave-responsive material W¹⁰ immersed in the electrolyte.

Figure 14:
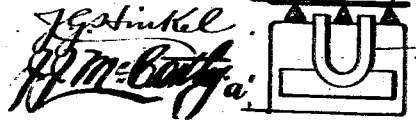
Figure 13:

In Figs. 13 and 14 I have shown another embodiment of my invention, wherein N represents a needle or conductor resting upon the edges of several pieces or blocks W¹² of carborundum, which are electrically connected together. In some instances it is desirable to hold the needle or conductor in position as by a weight N², or a permanent magnet N³, and in these cases, the needle and carborundum are respectively connected to the terminals, as indicated.

I have found that all of these various forms or embodiments of my invention are operative as wave-responsive devices, and I have made other embodiments and arrangements, not necessary to recite herein, these being sufficient to show the various manners of using my improved wave-responsive device or material.

In Fig. 2, I have illustrated an arrangement which I have found to be practically operative, in which there is an aerial receiver or wave-collector A, in which the antennæ are connected by the conductors a a to the ground conductor or antennæ a', and there is a signal-receiver R in the circuit from a portion of the antennæ between them and the ground. The receiver is bridged by a shunt-circuit c c', including a wave-responsive device W, there being no battery or other independent source of electric current. With this arrangement of circuits in connection with my improved wave-responsive device, I have been enabled to receive signals sent several hundred miles distant from the receiving-station.

It will be understood that any and all of the various forms of wave-responsive devices illustrated can be used in either of the arrangements of circuits described and illustrated in Figs. 1 and 2, or in any equivalent arrangement of circuits.

It will be understood that in actual practice, it is desirable to use some of the well-known tuning devices in connection with the wave-responsive device, as these tuning devices suppress a great many false signals, which would otherwise interfere to a greater or less extent with the understanding of the message, but I do not deem it necessary to show or describe any of these well-known adjuncts, as the wave-responsive device is operative without them as well as with them.

One of the advantages of the use of my improved wave-responsive material, especially in connection with an electrolyte in the manner indicated in Figs. 10 to 12 for instance, is that it is not only very sensitive as a receiver, but I have also found that it possesses the great advantage that the carborundum will not burn out or be destroyed when the receiver is located near a sending-station. Or, in other words, that the intense disturbances or waves produced at a sending-station located in proximity to my improved receiver, do not destroy or injure the same, as is the case with many other responsive devices of the electrolytic type.

If desired, the wave-responsive devices shown in Figs. 10, 11 and 12, may have a coating of glass or other insulating material of such form as to leave the desired area of the mass exposed.

What I claim is—

1. In the art of wireless telegraphy, as a wave-responsive device, a mass of non-metallic crystalline material.

2. In the art of wireless telegraphy, a wave-responsive device consisting essentially of carbon and silicon.

3. In the art of wireless telegraphy, as a wave-responsive device carbon and silicon in chemical combination.

4. In the art of wireless telegraphy, a wave-responsive device consisting essentially of crystalline carbon and silicon.

5. In the art of wireless telegraphy, as a wave-responsive device a concrete mass of crystalline silicide of carbon.

6. In the art of wireless telegraphy, as a wave-responsive device a body of carborundum.

7. In the art of wireless telegraphy, as a wave-responsive device an electrolyte and a mass of non-metallic crystalline material.

8. In the art of wireless telegraphy, as a wave-responsive device an electrolyte and electrodes of non-metallic crystalline material extending therein.

9. In the art of wireless telegraphy, a receiving apparatus comprising an aerial wire, a ground connection, a signal device in the ground connection, and a shunt-circuit bridging the signaling device and including as a wave-responsive device a mass of carborundum.

In testimony whereof I affix my signature in presence of two witnesses.

HENRY H. C. DUNWOODY.

Witnesses:
 FRANK L. FREEMAN,
 MILTON TIBBETTS.